United States Patent [19]

Drewes et al.

[11] Patent Number: 4,883,154

[45] Date of Patent: Nov. 28, 1989

[54] SELF-ALIGNING BEARING CARRIER

[75] Inventors: Douglas A. Drewes, West Bloomfield; Phillip D. Yee, Troy, both of Mich.

[73] Assignee: Federal-Mogul Corporation, Southfield, Mich.

[21] Appl. No.: 201,520

[22] Filed: Jun. 2, 1988

[51] Int. Cl.⁴ ........................................... F16D 23/14
[52] U.S. Cl. ................................. 192/98; 192/110 B
[58] Field of Search ........................ 192/98, 110 B

[56] References Cited

U.S. PATENT DOCUMENTS

| | | | |
|---|---|---|---|
| 2,119,990 | 6/1938 | Hilton | 384/535 |
| 2,504,776 | 4/1950 | Woodfield et al. | 384/535 |
| 3,061,386 | 10/1962 | Dix et al. | 384/535 |
| 3,625,327 | 12/1971 | Birdsey | 192/98 |
| 3,631,954 | 1/1972 | Coaley | 192/98 |
| 3,788,437 | 1/1974 | Camp | 192/98 |
| 4,143,748 | 3/1979 | Maucher | |
| 4,243,130 | 1/1981 | Vinel et al. | 192/98 |
| 4,276,974 | 7/1981 | Ladin | 192/98 |
| 4,352,419 | 10/1982 | Olschewski et al. | 192/98 |
| 4,643,286 | 2/1987 | Lassiaz | 192/98 |
| 4,684,005 | 8/1987 | Mittendorf | 192/98 |
| 4,724,943 | 2/1988 | Harrington et al. | 192/98 |

FOREIGN PATENT DOCUMENTS

| | | | |
|---|---|---|---|
| 1944839 | 1/1971 | Fed. Rep. of Germany | 192/98 |
| 3414834 | 10/1985 | Fed. Rep. of Germany | 192/92 |
| 2045380 | 10/1980 | United Kingdom | 192/98 |
| 2045381 | 10/1980 | United Kingdom | 192/92 |

Primary Examiner—Rodney H. Bonck
Assistant Examiner—Andrea Pitts
Attorney, Agent, or Firm—Lawrence J. Shurupoff

[57] ABSTRACT

A clutch release mechanism for absorbing misalignments might occur between an annular driven member such as a bearing carrier and a stationary guide element such as a quill over which the driven member axially slides. A resilient spacer member is arranged between inner and outer tubular sleeves forming parts of the driven member such that the outer sleeve can be misaligned with respect to the inner sleeve without adverse effect on performance of the driven member. By absorbing misalignment between the bearing carrier and quill, wear between these members is significantly reduced.

8 Claims, 1 Drawing Sheet

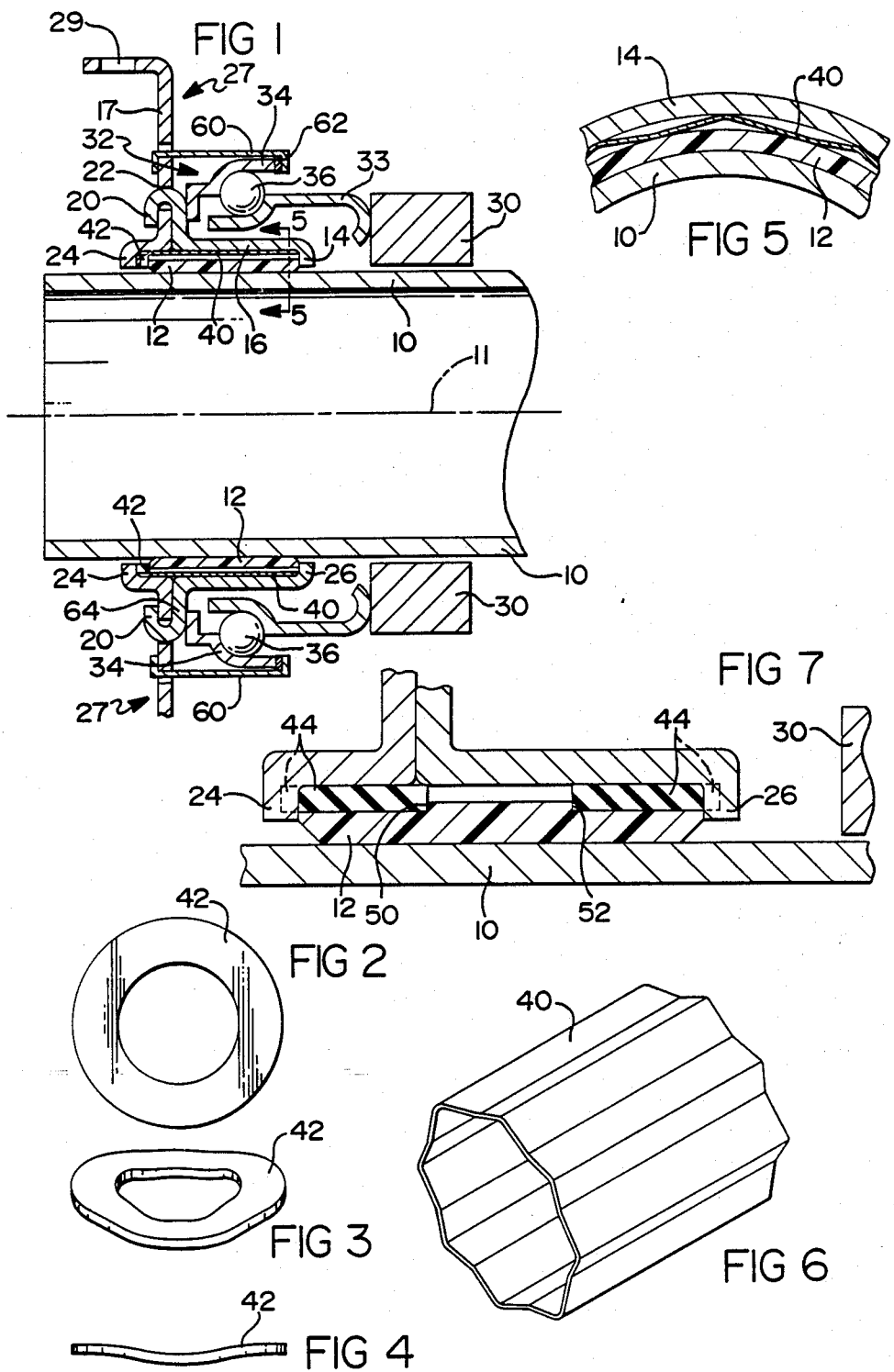

4,883,154

SELF-ALIGNING BEARING CARRIER

BACKGROUND OF THE INVENTION

1. Field of Invention

This invention relates generally to a motion-transmitting mechanism having an output member mounted for rotary and rectilinear motion on a stationary guide element, and particularly concerns a resilient spacer member that absorbs axial, radial and angular misalignment of a clutch release bearing carrier relative to a stationary guide element or quill over which the carrier reciprocates, thereby minimizing wear and preventing premature failure of the mechanism.

2. Description of Prior Developments

A long-standing problem in the design of clutch release mechanisms has been the rapid wear of the bearing carrier as it slides over its support shaft during engagement and disengagement of the clutch release bearing with the clutch fingers. Such wear is generally attributable to axial and radial misalignment between the axis of rotation of the clutch fingers and the central axis of the support shaft or quill. One attempt to compensate for this misalignment is shown in U.S. Pat. No. 3,921,776 to C. Sonnerat wherein a clutch release mechanism is provided with an elastomeric web element to absorb radial and angular misalignments that can occur between a stationary guide element and an annular rotary output structure.

SUMMARY OF THE INVENTION

The present invention relates to a relatively compact and low cost sleeve system for absorbing radial and angular misalignments that can occur between a stationary guide element and a driven member that slides thereon. The invention is particularly useful in automotive clutch release mechanisms wherein an axial (rectilinear) force must be applied to a rotating clutch control element during shifting from one transmission ratio to another to momentarily disengage the engine crankshaft from the transmission input shaft. A relatively simple resilient spacer member is arranged for axial compression between two sleeves that form parts of the driven member. As the sleeves of the driven member slide over the stationary guide element, the resilient spacer can buckle or deform to absorb any misalignment forces that would otherwise produce wear or abnormal stresses on the sliding surfaces between the guide element and one of the sleeves. A second resilient spacer may be used to further accommodate and reduce misalignment forces. The second spacer may take the form of a tubular spring radially fitted between the sleeves. An alternate form of the invention combines both axial and radial misalignment compensation within elastomeric rings fitted between the sleeves.

BRIEF DESCRIPTION OF THE DRAWINGS

FIG. 1 is a fragmentary sectional view taken through an automotive clutch release mechanism depicting the present invention.

FIG. 2 is a top plan view of an annular wave spring.

FIG. 3 a perspective view of the spring of FIG. 2.

FIG. 4 a side elevation view of the spring FIG. 2.

FIG. 5 a fragmentary enlarged sectional view taken through line 5—5 in FIG. 1.

FIG. 6 a perspective view of a resilient thin-walled tube.

FIG. 7 is a fragmentary sectional view illustrating an alternate embodiment of the invention using elastomeric spacer rings.

DESCRIPTION OF PREFERRED EMBODIMENTS OF THE INVENTION

FIG. 1 shows a portion of an automotive transmission clutch release mechanism that includes a hollow stationary shaft 10 of circular cross section acting as a rectilinear guide element or quill for an annular inner sleeve 12 preferably formed of a plastic or metallic material. Surrounding sleeve 12 is a second annular outer sleeve structure 14 formed by axially extending sections of two stamped bearing carrier components 16 and 17. Sleeves 12 and 14 together form a driven member which slides over shaft 10. Tabs 20 extend from component 16 through openings 22 in component 17 to clamp the two components together. Axial end portions of sleeve 14 are turned radially inwardly to form radial flanges 24 and 26 which captively retain sleeve 12 against excessive axial dislocation out of the space circumscribed by sleeve 14.

Stamped components 16 and 17 cooperatively define an integral bearing carrier actuator 27 for a disc-type clutch, not shown. For purposes of the invention actuator 27 may be considered merely as an input driving member engageable with a clutch fork for axial motion along the shaft 10. The clutch fork may be rotatably pinned to actuator 27 through a pair (one shown) of diametrically opposed bores 29 formed within actuator 27.

The input member 27 or actuator is typically operatively connected to a clutch foot pedal structure, not shown. Depression of the foot pedal moves actuator 27 rectilinearly to the right, whereupon an axial force is applied to an antifriction bearing assembly 32 carried by actuator 27. The axial input force is in turn transmitted to the axially biased spring loaded fingers 30 of a clutch pressure plate (not shown) to disengage the clutch.

Bearing assembly 32 may be constructed in various ways. As shown in FIG. 1, the bearing assembly includes a first race 33, a second race 34, and a ring of anti-friction ball elements 36. Race 34 is affixed to driving member 27 in a conventional manner such as by clamping via annular clip member 60.

An annular wave spring 62 axially biases the bearing assembly 32 against a radially extending flange 64 formed on sleeve 14. This conventional construction allows the bearing assembly 32 to move radially for self-aligning purposes. Race 33 is in pressure contact with clutch fingers 30 via the biasing force applied to the fingers by the clutch, but is otherwise axially unrestrained.

During motion of actuator 27 to the right, race 33 and the engaged clutch fingers 30 move axially and also rotationally. The attached sleeves 14 and 12 move axially but do not rotate. When pressure is removed from the foot pedal, a spring mechanism in the clutch returns the various components to their initial positions as shown in FIG. 1.

The invention particularly concerns a mechanism for absorbing radial and angular misalignment forces that are often present between actuator 27 and stationary guide element 10 due to misalignment between the centers of rotation of the clutch fingers 30 and the central or longitudinal axis of the guide element 10. The term "angular misalignment" refers to the rotational axis of outer sleeve member 14 tending to be at an angle to the geometrical axis 11 of guide element 10.

The object of the invention is to compensate for radial, axial and angular misalignment of actuator 27 that might otherwise produce severe wear on the inner surface of sleeve 12 and outer surface of guide element 10. In addition to wear, these misalignments also increase the axial force required to actuate the system, i.e. disengage the clutch. Thus, the present invention prevents excessive resistance to clutch pedal actuation and avoids wear between the bearing carrier and quill, i.e., between actuator 27 and guide element 10.

This misalignment compensation is provided by one or more resilient spacers located between inner sleeve 12 and outer sleeve 14. FIGS. through 7 show various forms that the resilient spacers may take. To prevent undesired end play between sleeves 12 and 14 a resilient spacer member is provided between end wall 24 and the associated end edge of sleeve 12. This spacer preferably takes the form of an annular wave spring 42 best seen in FIGS. 1-4. Spring 42 is preferably formed of flat strip material such as metal or plastic and is provided to compensate for manufacturing tolerances and also for slight changes in the effective axial length of the space defined between flanges 24 and 26 when the sleeve 14 axis is at an angle to axis 11.

Radial misalignment between the inner sleeve 12 and outer sleeve 14 is also accommodated by spring 42 in a manner similar to the action of wave spring 62. Axial compression of spring 42 provides a frictional retaining force between sleeves 12 and 14 to allow the outer sleeve 14 to axially and radially shift about the inner sleeve 12 within predetermined limits. This arrangement allows the inner sleeve 12 to maintain a substantially coaxial alignment with the shaft or quill 10.

Such coaxial alignment ensures that little if any radial misalignment forces are transferred from the actuator 27 and bearing assembly 32 to the shaft 10. The outer sleeve 14 simply axially tilts or radially slides about the inner sleeve 12 by overcoming the frictional resistance provided between the sleeves by spring 42. This movement between the sleeves ensures the substantially continuous contact between the inner cylindrical surface of sleeve 12 and the outer cylindrical surface of shaft 10 so that all loads transmitted to sleeve 12 are distributed over a large surface area to further reduce contact stresses induced by misalignment.

In FIGS. 5 and 6 a second optional spacer is formed as a resilient thin-walled tube 40 having an undulating cross section. The wall thickness of tube 40 is substantially less than the radial spacing between sleeves 12 and 14. The amplitudes of the undulations are such that outer surfaces of alternate ones of the undulations engage sleeve 14, whereas inner surfaces of the remaining undulations engage sleeve 12.

Tube 40 has a length that is approximately the same as the length of sleeve 14, whereby the tube provides a full length radial cushion between the two sleeve structures. Tube 40 acts as a relatively stiff spring to provide radial support for output member or actuator 27. At the same time tube 40 is able to deflect in response to radial load forces. Sleeve 14 can thereby shift radially relative to sleeve 12 as well as nutate, wobble or tilt so that its axis is at an angle to axis 11. The resilient tube 40 will accommodate each type of deflection. The tube undulations can slide on the sleeve surfaces while the tube is deflecting.

FIG. 7 shows a second form that the resilient spacer can take. Two axially spaced elastomeric rings 44 are bonded to sleeve 12 and maintained in pressure contact with sleeve 14 by slight radial compression. Rings 44 may be formed of natural or synthetic rubber, neoprene, polyurethane or any other elastic material which will resiliently absorb axial, radial and angular dislocations of sleeve 14 through elastic deformation. It is preferable to dimension each ring so that it is axially compressed as represented in phantom in FIG. 7 between tabs 24 and 26 and radial steps 50, 52 formed on sleeve 12. This axial compression of rings 44 provides a frictional locating force between sleeves 12 and 14 in a manner similar to that provided by spring 42 in FIG. 1. Of course, a single axially elongated tubular elastomeric ring could take the place of the two axially spaced rings 44.

The aforementioned anti-friction bearing assembly 32 may, or may not, be used in the FIG. 7 arrangement. If bearing assembly 32 is not used, the aforementioned input member 30 may abut end wall 26 (or a wear element attached thereto). As previously noted, the invention is not especially concerned with the way in which the input force is applied to output member 27. The invention is primarily concerned with the resilient spacer 42 for absorbing radial and angular misalignment between input driving member 27 and stationary guide member 10.

A particular advantage of locating the radially resilient spacer between the inner sleeve 12 and outer sleeve 14 and radially outwardly of inner sleeve 12 is that the inner tubular surface of inner sleeve 12 may be closely and intimately fitted over shaft 10 with a tightly controlled sliding fit. This tight fit prevents abrasive contaminants from entering between the shaft 10 and sleeve 12 and thereby reduces wear on each member. In fact, the use of a lubricant between the shaft 10 and sleeve 12 can be omitted because of this exclusion of contaminants as well as the misalignment compensation provided by the resilient spacers 40, 44. That is, since the resilient spacers prevent the application of radial loads on the inner sleeve, lubricant is unnecessary to accommodate the friction which would otherwise occur in conventional sleeves without resilient spacers.

Obviously, numerous modifications and variations of the present invention are possible in light of the above teachings. It is therefore to be understood that within the scope of the appended claims, the invention may be practiced otherwise than as specifically described herein.

We claim:

1. A clutch release apparatus for use with a stationary rectilinear guide element, said apparatus comprising:
    a driven member surrounding said guide element for rectilinear motion thereon, said driven member comprising an outer sleeve and an inner sleeve located within said outer sleeve and slidably mounted on said guide element wherein said outer sleeve comprises radially inwardly extending walls captively retaining said inner sleeve against axial dislocation within an annular space circumscribed by said outer sleeve; and
    resilient spacer means located between said inner and outer sleeves and operable to absorb radial and angular misalignments between said sleeves.

2. The apparatus of claim 1, wherein said resilient spacer means comprises an annular wave spring located between one of said inwardly extending walls and an edge portion of said inner sleeve.

3. The apparatus of claim 1 wherein said resilient spacer means comprises a tubular member having an undulating cross section arranged so that outer surfaces of selected undulations engage said outer sleeve, and inner surfaces of other undulations engage said inner sleeve.

4. The apparatus of claim 3 wherein said tubular member has approximately the same length as said inner sleeve to provide a full length cushion between said sleeves.

5. The apparatus of claim 4 wherein said tubular member is a thinwalled tube having a wall thickness that is substantially less than the radial spacing between said sleeves.

6. The apparatus of claim 1 wherein said resilient spacer means comprises at least one elastomeric ring surrounding said inner sleeve in pressure contact with said outer sleeve.

7. The apparatus of claim 1 wherein said resilient spacer means comprises a plurality of axially-spaced elastomeric rings.

8. A clutch release apparatus for use with a stationary rectilinear guide element, said apparatus comprising:
a driven member surrounding said guide element for rectilinear motion thereon, said driven member comprising an outer sleeve and an inner sleeve located within said outer sleeve, said inner sleeve being slidably mounted on said guide element;
resilient spacer means located between said inner and outer sleeves and operable to absorb radial and angular misalignments between said sleeves; and
axially-spaced radially-extending retaining means operatively associated with said inner and outer sleeves for retaining such inner and outer sleeves against relative axial dislocation, said resilient spacer means being in biased engagement with and axially restrained by said retaining means.

* * * * *